United States Patent [19]

Tanaka et al.

[11] Patent Number: 4,885,937

[45] Date of Patent: Dec. 12, 1989

[54] FLOW SENSOR

[75] Inventors: Nobuyuki Tanaka, Kyoto; Yasuhiko Inami, Nara; Masaya Hijikigawa, Yamatokoriyama; Shoei Kataoka, Tanashi, all of Japan

[73] Assignee: Sharp Kabushiki Kaisha, Osaka, Japan

[21] Appl. No.: 175,561

[22] Filed: Mar. 31, 1988

[30] Foreign Application Priority Data

Mar. 31, 1987 [JP] Japan .................................. 62-79244

[51] Int. Cl.$^4$ ............................................. G01F 1/68
[52] U.S. Cl. ..................................... 73/189; 73/204.26
[58] Field of Search ............ 73/188, 189, 204, 204.25, 73/204.26, 204.27

[56] References Cited

U.S. PATENT DOCUMENTS

| | | | |
|---|---|---|---|
| 3,677,085 | 7/1972 | Hayakawa | 73/204 |
| 3,995,481 | 12/1976 | Djorup | 73/189 |
| 4,024,761 | 5/1977 | Djorup | 73/189 X |
| 4,135,396 | 1/1979 | Stanke et al. | 73/204 |
| 4,391,137 | 7/1983 | Kerfoot et al. | 73/204 |
| 4,399,698 | 8/1983 | Hiromasa et al. | 73/204 |
| 4,478,076 | 10/1984 | Bohrer | 73/204 |
| 4,576,050 | 3/1986 | Lambert . | |
| 4,587,843 | 5/1986 | Tokura et al. | 73/204 |
| 4,637,253 | 1/1987 | Sekimura et al. | 73/189 |

FOREIGN PATENT DOCUMENTS 0021291 1/1981 European Pat. Off. .
2171800A 9/1986 United Kingdom .

Primary Examiner—Herbert Goldstein
Attorney, Agent, or Firm—Irell & Manella

[57] ABSTRACT

A flow sensor for detecting the rate of flow and the direction of flow of a fluid, comprising a substrate, a heating element disposed on the substrate, and four or more fluid temperature sensing elements disposed with an equal space therebetween on a virtual circle around the heating element, wherein the difference in temperature between the fluid and the heating element is maintained at a fixed level by the control of current that is applied to the heating element, so that the flow rate of the fluid can be calculated from changes in the current that corresponds to the flow rate of the fluid, and at the same time, the difference in current or in potential between the fluid temperature sensing elements is calculated from changes in temperature therebetween that arise from changes in the direction of flow of the fluid, so that the direction of flow of the fluid can be detected.

10 Claims, 7 Drawing Sheets

FLOW SENSOR

BACKGROUND OF THE INVENTION

1. Field of the invention:

This relates to a flow sensor that detects not only the rate of flow but also the direction of flow of a fluid such as gas or liquid.

2. Description of the prior art:

As thermal flow sensors that detect the direction of flow of a fluid, semiconductor type flow sensors have been proposed in Japanese Laid-Open Patent Publication No. 60-247171. Since silicon is used for a substrate of the flow sensors, the flow sensors have an high thermal conductivity and the difference in temperature within the sensor chip that arises from the flow of gas is in the range of around 1/100° to 1/10° C. (Electronic Materials, No. 12, pp. 38–43 (1983)). The said difference in temperature can be determined by detecting the difference in temperature between a pair of temperature sensing transistors with high sensitivity that constitute a bridge circuit in each flow sensor. Although these flow sensors can be mass-produced by a semiconductor processing technique using silicon, they are disadvantageous in that the temperature characteristics vary between the flow sensors. Moreover, it is impossible to set the temperatures of these flow sensors at a high level.

Figure 8A:
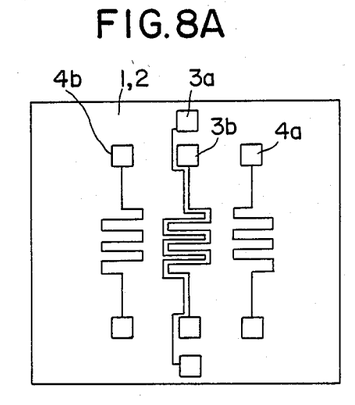
FIG. 8A and 8B, respectively, are a plane view and a sectional view showing a conventional heat-insulation-type thermal flow sensor.
Figure 8B:
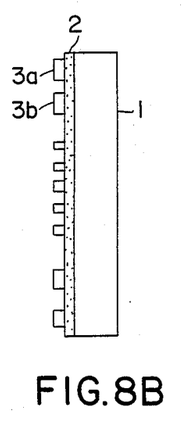
Figure 9:
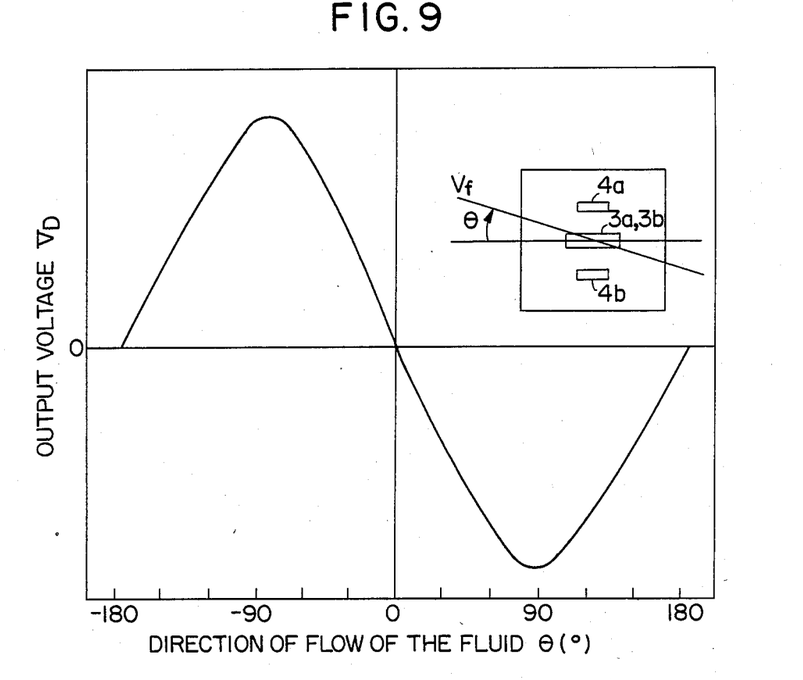
FIG. 9 is of a characteristic curve showing the relationship between the direction of flow of a fluid and the output voltage of the flow sensor shown in FIG. 8.

In order to solve the above-mentioned problems, a thermal flow sensor that can be mass-produced with uniform sensor-characteristics and that attains stabilized operation even at a high temperature has been proposed in Japanese Patent Application No. 61-232885 "A FLOW SENSOR" that was filed on Sept. 29, 1986 in the name of this applicant, as shown in FIGS. 8A and 8B, in which a pair of fluid temperature sensing resistors $4a$ and $4b$ are disposed on a heat-insulating substrate 1 in such a manner that the fluid temperature sensing resistors $4a$ and $4b$ are symmetrical about a heating resistor $3a$ positioned in the center of the said substrate 1. The substrate 1 has a thermal conductivity of 2 w/m.k or less. The temperature of the heating resistor $3a$ is controlled so that the difference in temperature between the fluid and the heating resistor $3a$ can be maintained at a fixed level. From current that flows through the heating resistor $3a$ (the said current changing with a change in the flow rate of the fluid) or from the electrical potential or voltage that changes that a change in the said current flowing through the heating resistor $3a$, the flow rate of the fluid is measured. At the same time, the difference in temperature arising between the two fluid-temperature sensing resistors $4a$ and $4b$ is measured as the difference in current or in voltage therebetween, from which the direction of flow of the fluid can be detected. A coated film 2 is deposited therebetween so as to strongly adhere the resistors $3a$, $4a$ and $4b$ to the substrate 1. A monitor $3b$ that monitors the temperature of the heating resistor $3a$ is disposed in the vicinity of the heating resistor $3a$. FIG. 9 shows the relationship between the direction of flow of the fluid, $\theta$, and the difference in temperature between the fluid temperature sensing resistors $4a$ and $4b$, wherein the said difference in temperature is represented by the difference in voltage, $V_D$, that is determined by the use of a bridge circuit. This flow sensor is disadvantageous in that two values of an angle $\theta$ indicating the direction of flow of the fluid for one value of the difference in voltage (i.e., the output voltage), $V_D$, are obtained. Moreover, since the output voltage $V_D$ is influenced by the flow rate of the fluid, calibration of the output voltage $V_D$ is necessary.

SUMMARY OF THE INVENTION

The flow sensor of this invention, which overcomes the above-discussed and numerous other disadvantages and deficiencies of the prior art, comprises a substrate, a heating element disposed on said substrate, and four or more fluid-temperature sensing elements disposed with an equal space therebetween on a virtual circle around said heating element, said substrate being made of a heat-insulating material.

In a preferred embodiment, the substrate is made of a heat-insulating material with a thermal conductivity of 2 w/m.k or less.

In a preferred embodiment, the heating element is an electrical resistor.

In a preferred embodiment, each of the fluid temperature sensing elements is an electrical resistor.

In a preferred embodiment, a temperature monitor for monitoring the temperature of the heating element is disposed in the vicinity of said heating element so as to control the temperature of said heating element.

In a preferred embodiment, the heating element of said temperature monitor is made of a thin metal film that has been patterned on said substrate.

In a preferred embodiment, the fluid temperature sensing elements are made of a thin metal film that has been patterned on said substrate.

In preferred embodiment, the material of said thin metal film is platinum.

The flow sensor of this invention also comprises a substrate, a heating element disposed on said substrate, and four or more fluid temperature sensing elements disposed with an equal space therebetween on a virtual circle around said heating element, wherein the difference in temperature between the fluid and the heating element is maintained at a fixed level by the control of current that is applied to said heating element, so that the flow rate of this fluid can be calculated from changes in the current that corresponds to the flow rate of the fluid, and at the same time, the difference in current or in potential between said fluid temperature sensing elements is calculated from changes of temperature therebetween that arise from changes in the direction of flow of the fluid, so that the direction of flow of the fluid can be detected.

Thus, the invention described herein makes possible the objectives of (1) providing a flow sensor for detecting the direction of flow of a fluid that can be mass-produced with uniform sensor-characteristics using a process for the production of semiconductor devices; (2) providing a flow sensor that attains stabilized operation even at a high temperature; (3) providing a flow sensor that can be produced at low cost; (4) providing a flow sensor that can be miniaturized; and (5) providing a flow sensor that consumes less electrical power.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

This invention provides a flow sensor in which a heating element (e.g., a heating resistor) is disposed in the center of a heat-insulating substrate and four or more fluid temperature sensing elements (e.g., fluid temperature sensing resistors) are disposed with an equal space on a virtual circle that is drawn around the heating element. The temperature of this heating element is controlled so that it can be maintained at a higher level than the temperature of a fluid by a fixed temperature span, and moreover the difference in temperature arising between the fluid temperature sensing elements is detected as the difference in current or in voltage therebetween, thereby detecting the direction of flow of the fluid. Also, when the temperature of the heating element is controlled so that it can be maintained at a higher level than the temperature of the fluid by a fixed temperature span, current that flows through the heating element (the said current changing with a change in the flow rate of the fluid) or the electrical potential voltage of the heating element that changes with a change in the current is detected, thereby detecting the flow rate of the fluid.

The substrate is a heat-insulating substrate, e.g., a glass substrate, having a thermal conductivity of 2 w/m.k or less, which makes the difference in temperature within the sensor chip sufficiently big, so that the difference in temperature arising between the four or more temperature sensing elements can be made large. Thus, the production of the flow sensor of this invention becomes easy and the reliability of the flow sensor becomes high. A resistor material that is used for a monitor for monitoring the temperature of the heating element and that is used for the fluid temperature sensing resistors is insufficiently adhered to the glass substrate when the resistor material is a noble metal such as platinum or the like, and thus the flow sensor obtained is inferior in reliability. When a substrate that is made of glass coated with alumina is used for the heat-insulating substrate of a flow sensor of this invention, excellent adhesion can be attained between the substrate and the heating element, between the substrate and the monitor for monitoring the temperature of the heating element, and between the substrate and the fluid temperature sensing elements. As mentioned above, this invention provides a flow sensor with high reliability in which a hating element, a monitor for monitoring the temperature of the heating element, and fluid temperature sensing element are incorporated into one body.

EXAMPLE 1

Figure 1A:
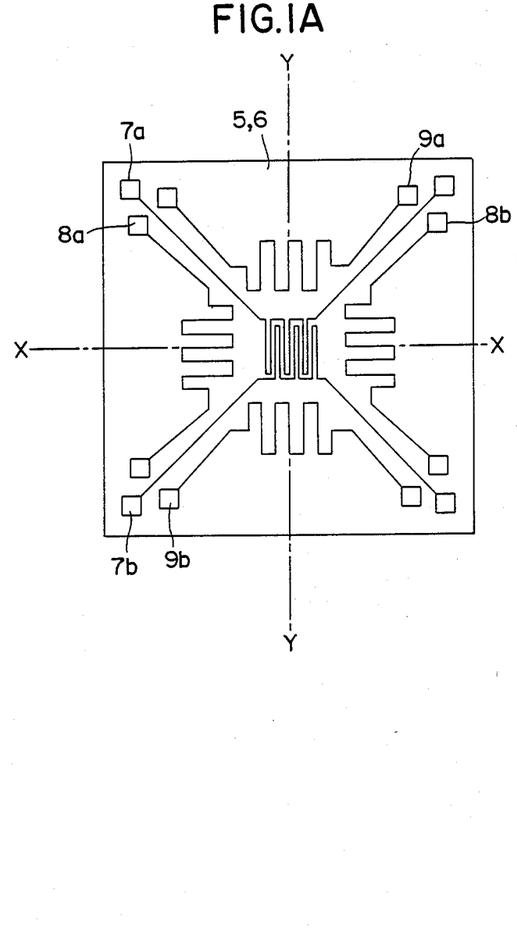
FIGS. 1A and 1B, respectively, are a plane view and a sectional view showing a flow sensor of this invention.
Figure 1B:
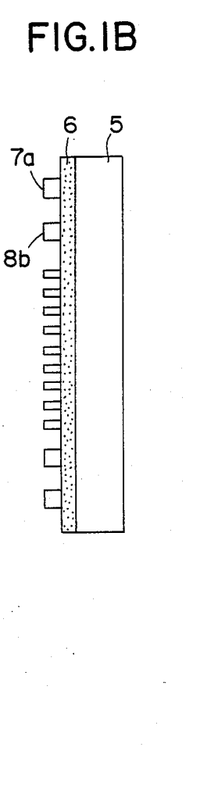

FIGS. 1A and 1B show a flow sensor of this invention, which is produced as follows: On a glass substrate 5, a thin alumina film 6 is formed by a thinfilm growth technique such as the vacuum vapor deposition method, the spattering method, plasma assisted chemical vapor deposition, or the like. Then, on the thin alumina film 6, a thin metal film of platinum or the like because of the high resistance temperature coefficient is formed in the same manner as mentioned above by the vacuum vapor deposition method, the spattering method, plasma assisted chemical vapor deposition, or the like. Then, the thin metal film alone is patterned by an etching technique, resulting in, as shown in FIG. 1A, a heating resistor 7a, a monitor 7b for monitoring the temperature of the heating resistor 7a, fluid temperature sensing resistors 8a, 8b, 9a and 9b with a suitable space therebetween. The fluid temperature sensing resistors 8a, 8b, 9a and 9b are positioned on the alumina covered substrate 5 in a manner that is symmetrical about the center lines X—X and Y—Y. Then, a glass substrate 5, on which a unit that is composed of the heating resistor 7a, the temperature monitor 7b, and the fluid temperature sensing resistors 8a, 8b, 9a and 9b is disposed, is cut out, resulting in a flow sensor chip. The chip is a small chip having a size of as small as several millimeters, so that it can be obtained by a wafery process by which a number of chips are produced at the same time with uniform sensor-characteristics. A chip obtained by cutting the wafer is fixed at the supporting plate (not shown) and connected to necessary elements by leads, resulting in a flow sensor of this example.

The material used for the thin metal film is not limited to platinum, but it can be of nickel or nickel alloy because of the high resistance temperature coefficient. Moreover, instead of the thin metal film, thermo-sensitive resistor materials used in thermisters other than metals can be used.

Figure 2:
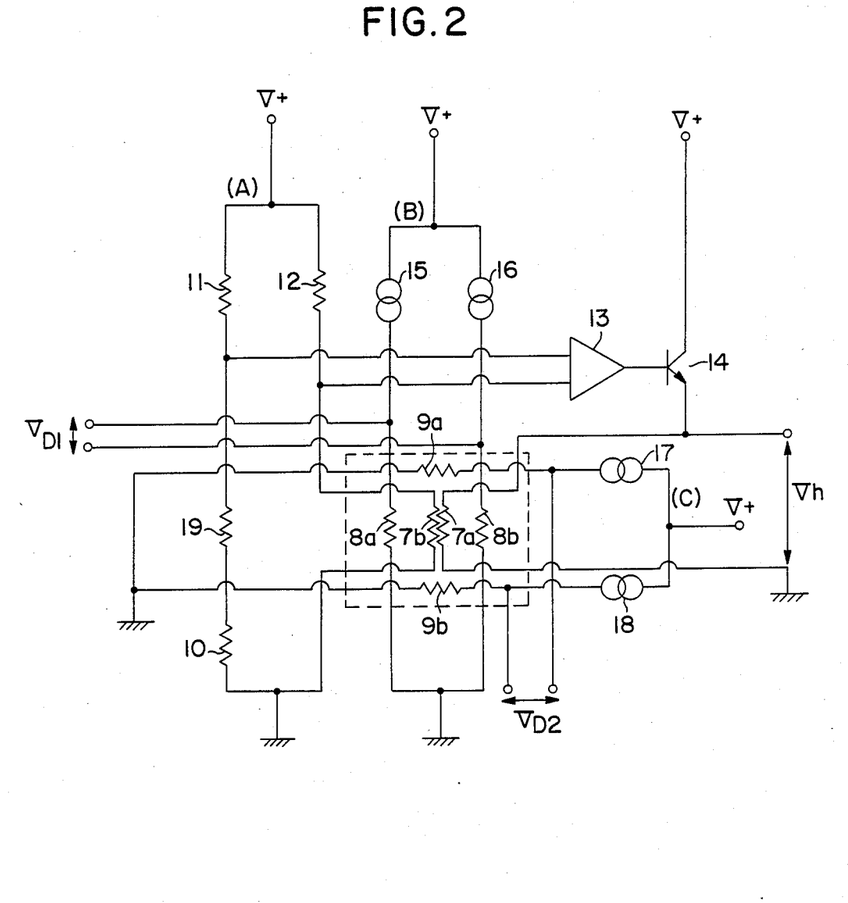
FIG. 2 is a electronic circuitry block diagram to detect a flow of a fluid using the flow sensor of FIG. 1.

FIG. 2 shows a circuit of the flow sensor produced above, which is composed of a set of the heating resistor 7a, the temperature monitor 7b for monitoring the temperature of the heating resistor 7a, the fluid temperature sensing resistors 8a, 8b, 9a and 9b, and the fluid temperature compensating resistor 10. The flow sensor is placed within a flow path (not shown) through which fluid such as gas or liquid flows. The fluid temperature compensating resistor 10 and the temperature monitor 7b are connected to electrical resistors 11 and 12, respectively, resulting in a bridge circuit A. The connection point between the fluid temperature compensating resistor 10 and the monitor 7b for monitoring the temperature of the heating resistor 7a is grounded. The bridge circuit A is connected to a feedback circuit in which the difference in potential between one circuit (composed of the electrical resistor element 11, the fluid temperature compensating resistor and an electrical resistor 19) and the other circuit (composed of the electrical resistor element 12 and the temperature monitor 7b) is amplified by a differential amplifier 13 to control the base potential of a switching transistor 14, allowing the transistor 14 to be driven. In this way, the potential of the heating resistor 7a is controlled. The fluid temperature sensing resistors 8a, 8b, 9a and 9b are connected to fixed current sources 15, 16, 17 and 18, respectively, resulting in bridge circuits B and C. The connection points between the fluid temperature sensing resistors 8a and 8b and between the fluid temperature sensing resistors 9a and 9b are grounded, respectively.

Figure 3:
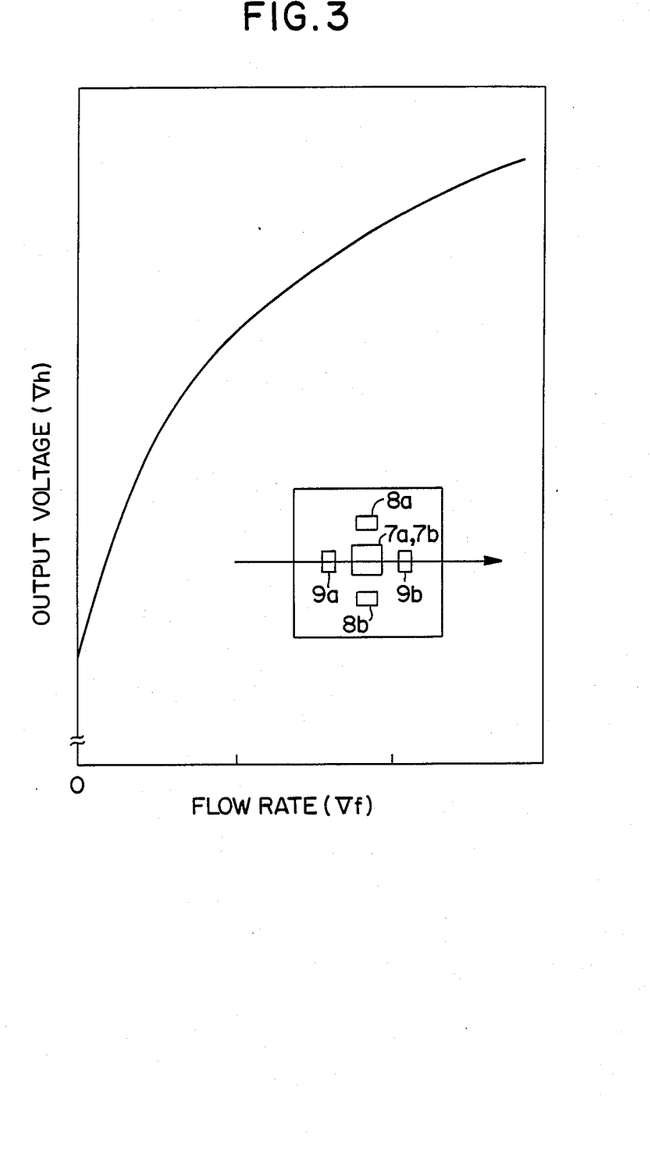
FIG. 3 is of a characteristic curve showing the relationship between the flow rate of a fluid and the output voltage of the flow sensor shown in FIG. 1.

FIG. 3 shows the relationship between the flow rate $V_f$ of a fluid and the output voltage $V_h$ of the heating resistor 7a that changes with a change in the flow rate $V_f$. The temperature of the heating resistor 7a is maintained to be higher by a fixed temperature span than that of the fluid by means of the electrical resistor 19. When the flow rate of the fluid flowing through the flow path is high, a large amount of heat is transferred from the heating resistor 7a to the fluid. On the contrary, when the flow rate of the fluid is low, a small amount of heat is transferred from the heating resistor 7a to the fluid.

Thus, the flow rate of the fluid can be determined as follows: The temperature of the fluid is measured by the fluid temperature compensating resistor 10, and the difference in temperature between the fluid and the heating resistor 7a is maintained at a fixed level by the control of current that is applied to the heating resistor 7a through the feedback circuit, so that the flow rate of the fluid can be calculated from changes in the current (or the voltage) that corresponds to the flow rate of the fluid (or the amount of flow of the fluid).

Figure 4:
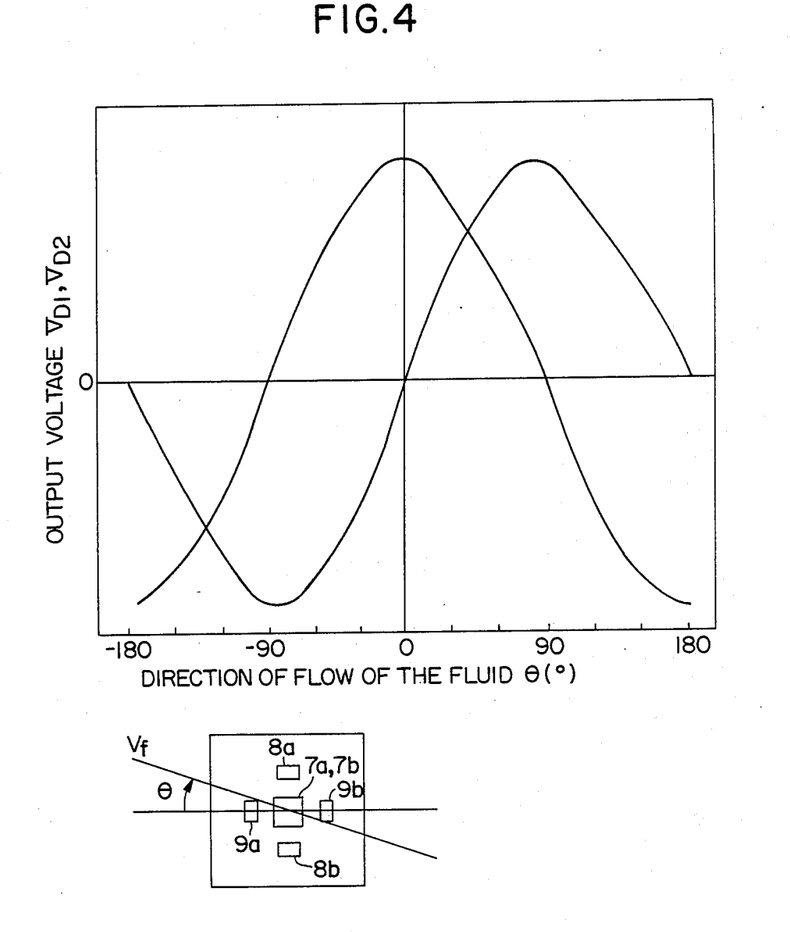
FIG. 4 is of characteristic curves showing the relationship between the direction of flow of a fluid and the output voltage of the flow sensor shown in FIG. 1.
Figure 5:
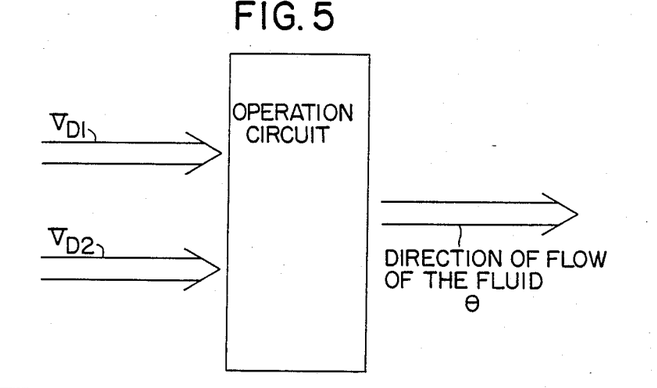
FIG. 5 is a diagram illustrating a way for processing the signals from the flow sensor shown in FIG. 2.
Figure 6:
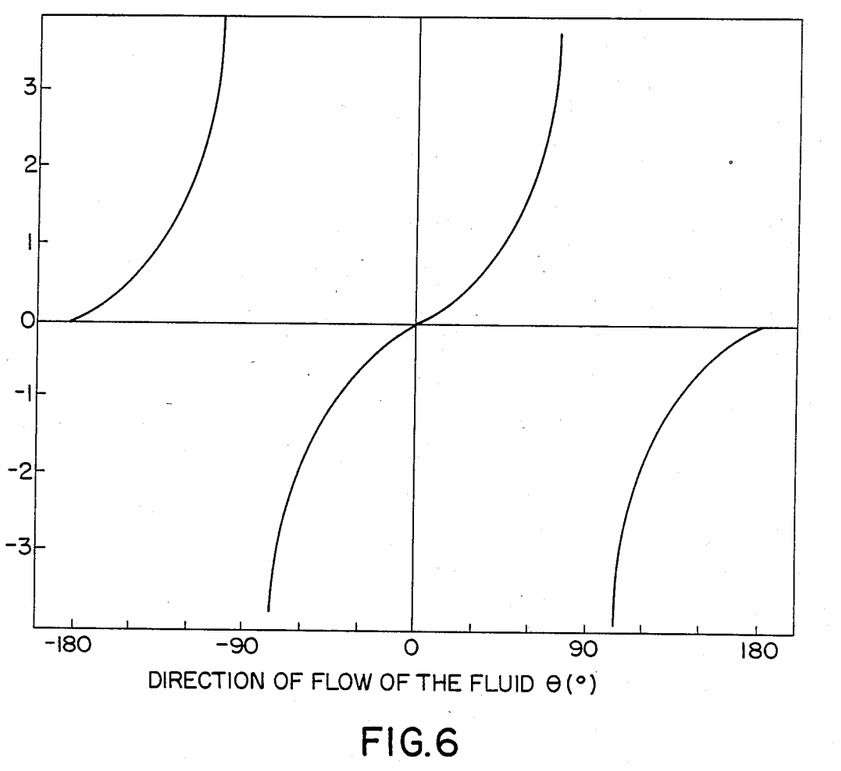
FIG. 6 is of the result that is obtained by the signed processing way shown in FIG. 5.

FIG. 4 shows the relationship between the direction $\theta$ of flow of the fluid and the difference in potential of the bridge circuits B and C. The fluid temperature sensing resistors 8a, 8b, 9a and 9b are connected to fixed current source 15, 16, 17 and 18, respectively, in the bridge circuits B and C. The changes in the temperature distribution within the substrate that arise from changes in the direction of flow of the fluid are converted into changes in voltage, which correspond to the differences in potential (i.e., the output voltages $V_{D1}$ and $V_{D2}$). The output voltages $V_{D1}$ and $V_{D2}$ can be approximated by the following equations, respectively: $V_{D1}=f(V_f)\cdot\sin\theta$, and $V_{D2}=f(V_f)\cdot\cos\theta$, wherein $f(V_f)$ is the function of the flow rate $V_f$ of the fluid. The output voltages $V_{D1}$ and $V_{D2}$ are supplied to the operation circuit as shown in FIG. 5, and thus the direction of flow of the fluid can be detected. The operation circuit achieves the following operation, the results of which are shown in FIG. 6:

$$\theta = \tan^{-1}\frac{f(V_f)\sin\theta}{f(V_f)\cos\theta} = \tan^{-1}\frac{V_{D1}}{V_{D2}}$$

Since the operation circuit is a division circuit, the member $f(V_f)$ of the above-mentioned equation that has a relation with the flow rate of the fluid is eliminated. Thus, the output from the operation circuit gives the direction of flow of the fluid without any relation with the flow rate of the fluid.

Although this example only discloses a flow sensor by which the flow rate of a fluid is determined by means of a bridge circuit that is provided with the temperature monitor 7b for monitoring the temperature of the heating resistor 7a and the fluid temperature compensating resistor 10, it is not limited thereto. The flow sensor can be constructed such that the flow rate is determined by means of a bridge circuit that is provided with the heating resistor 7a and the fluid temperature compensating resistor 10.

EXAMPLE 2

Figure 7:
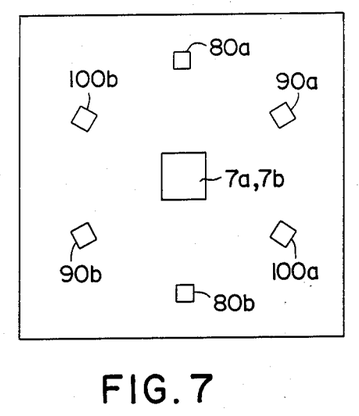
FIG. 7 is a plane view showing another flow sensor of this invention.

FIG. 7 shows another flow sensor of this invention, in which six fluid-temperature sensing resistors 80a, 80b, 90a, 90b, 100a and 100b are disposed with an equal space therebetween on a virtual circle that is formed around the heating resistor 7a.

As a heating element, a circuit device such as a high output transistor, a thermoelectric effect device, or the like other than resistor elements can be used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A flow sensor comprising a single substrate, a heating element disposed on said substrate, and four or more fluid-temperature sensing elements disposed with an equal space therebetween on a virtual circle around said heating element, wherein said substrate is made of a heat-insulating material with a thermal conductivity of 2 w/m·k or less.

2. A flow sensor according to claim 1, wherein said heating element is an electrical resistor.

3. A flow sensor according to claim 2, wherein a temperature monitor for monitoring the temperature of the heating element is disposed in the vicinity of said heating element so as to control the temperature of said heating element.

4. A flow sensor according to claim 1, wherein each of said fluid temperature sensing elements is an electrical resistor.

5. A flow sensor according to claim 4, wherein said fluid temperature sensing elements are made of a thin metal film that has been patterned on said substrate.

6. A flow sensor according to claim 5, wherein the material of said thin metal film is platinum.

7. A flow sensor according to claim 1, wherein a temperature monitor for monitoring the temperature of the heating element is disposed in the vicinity of said heating element so as to control the temperature of said heating element.

8. A flow sensor according to claim 7, wherein said heating element of said temperature monitor is made of a thin metal film that has been patterned on said substrate.

9. A flow sensor according to claim 8, wherein the material of said thin metal film is platinum.

10. A flow sensor for detecting the rate of flow and the direction of flow of a fluid, comprising a single substrate, a heating element disposed on said substrate, and four or more fluid temperature sensing elements disposed with an equal space therebetween on a virtual circle around said heating element, means for maintaining a difference in temperature between the fluid and the heating element at a fixed level by the control of current that is applied to said heating element, means for calculating a flow rate of the fluid from changes in the current that corresponds to the flow rate of the fluid and for calculating a difference in current or in potential between said fluid temperature sensing elements from changes in the direction of flow of the fluid, for detecting the direction of flow of the fluid, wherein said substrate is made of a heat-insulating material with a thermal conductivity of 2 w/m·k or less.

* * * * *